INVENTOR.
GEORGE L. USSELMAN
BY H. S. Grover
ATTORNEY

July 18, 1950 G. L. USSELMAN 2,515,971
OSCILLATORY ENERGY GENERATING AND MODULATING SYSTEM
Filed July 28, 1945 4 Sheets-Sheet 2

INVENTOR.
GEORGE L. USSELMAN
BY H. S. Grover
ATTORNEY

July 18, 1950

G. L. USSELMAN

OSCILLATORY ENERGY GENERATING AND MODULATING SYSTEM 2,515,971

Filed July 28, 1945

4 Sheets-Sheet 3

INVENTOR.
GEORGE L. USSELMAN
BY H. S. Grover
ATTORNEY

July 18, 1950 G. L. USSELMAN 2,515,971

OSCILLATORY ENERGY GENERATING AND MODULATING SYSTEM

Filed July 28, 1945 4 Sheets-Sheet 4

INVENTOR.
GEORGE L. USSELMAN
BY H. S. Grover
ATTORNEY

Patented July 18, 1950 2,515,971

UNITED STATES PATENT OFFICE 2,515,971

OSCILLATORY ENERGY GENERATING AND MODULATING SYSTEM

George L. Usselman, Port Jefferson, N. Y., assignor to Radio Corporation of America, a corporation of Delaware Application July 28, 1945, Serial No. 607,646

7 Claims. (Cl. 332—23)

Figures 1, 2:
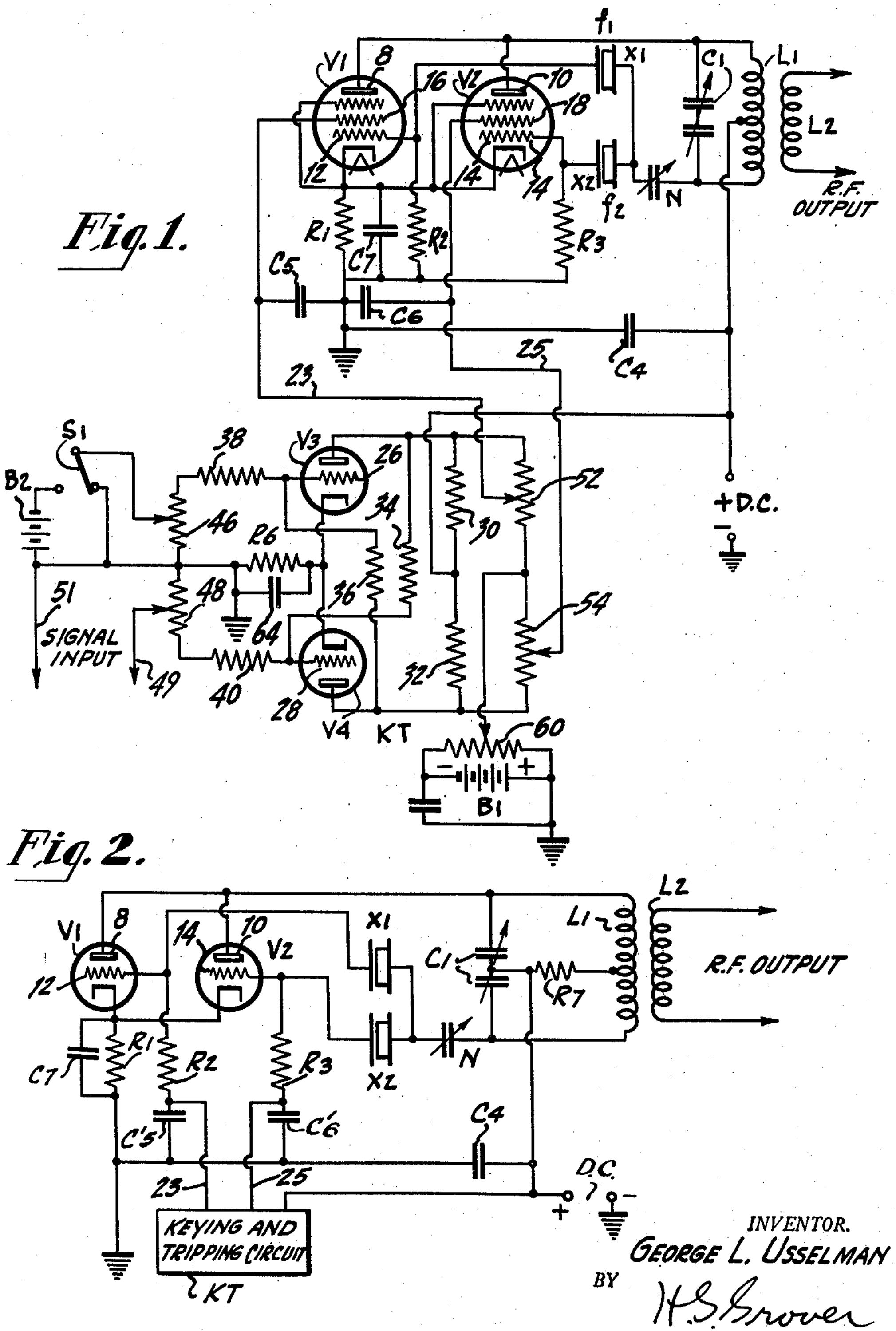

This application discloses an improved signalling system wherein oscillatory energy is generated and modulated as to frequency in accordance with signals. The signals may represent voice, telegraphy, facsimile, etc. The embodiments illustrated are particularly well adapted for production and transmission of energy representing telegraphy markings or facsimile signals, etc., and in describing my invention reference will be made to such signals although it will be understood that signals of other types may be used. In particular my system is useful in telegraphy and facsimile systems wherein signalling is accomplished by developing carrier energy which is shifted from one frequency which may be designated "space" condition to another frequency designated "mark" and representing "signal on" condition. Systems of this type are known in the radio and allied arts as spaced wave telegraphy or frequency shift telegraphy systems.

When intelligence is to be transmitted by producing oscillations and shifting the frequency thereof between two values by signals or producing oscillations of two frequencies, turned on and off alternately in accordance with signals, it is important that the oscillations may be readily keyed from the first frequency to the second frequency or readily turned on and off in accordance with signals, and yet the oscillations should be stabilized as to the two frequencies. Moreover, it is important that the extent of shift between the two frequencies be constant during operation. In many systems known heretofore in the prior art there is a tendency of the oscillations to drift in frequency. An object of my present invention is improvement of frequency shift telegraphy systems in this respect. To accomplish this I provide an oscillation generator system wherein two piezo crystals ground for different frequencies, one of which may represent mark and the other of which may represent space, are used. The set up is such that the oscillators operate at a common frequency. When signalling currents are applied the oscillators operate at one or the other crystal frequency, depending upon whether marking signal or spacing signal is on the received signalling current.

Frequency shift telegraphy systems using crystal stabilizers are known in the art. Many of these systems are complicated in nature and use a plurality of tubes and connections for the oscillation generating and modulating functions.

An object of my invention is to provide a simple and compact circuit arrangement for use in frequency shift telegraphy systems. This object is attained by the use of a pair of electron discharge devices in a simple though novel circuit arrangement including two piezo electric crystals, one operating normally at mark frequency and the other operating normally at space frequency, separated from mark frequency by the desired frequency separation. Moreover, in my system the same pair of tubes serves as the modulating means, assuming the modulating currents at hand are of sufficient amplitude or intensity to control the tubes. The two piezo electric crystals are preferably separated by a small frequency band such that in the system as operated they may be entrained to operate at the same frequency, which they will do if the frequency separation is not too great.

In describing my invention in detail reference will be made to the attached drawings wherein Figs. 1 to 8 each illustrates by circuit connections and tube and electrode symbols and circuit element symbols the essential features of a frequency shift modulation system arranged in accordance with my invention. In all of the figures, except Fig. 8, the generator comprises a pair of electron discharge devices V1 and V2 having their oscillator anodes connected in parallel by a tank circuit which also serves as the output circuit and has other functions as will appear in detail hereinafter. A point intermediate the ends of the tank circuit is coupled to ground and the cathodes of the tubes by a path of low impedance to voltages of the generated frequency. The other end of the tank circuit is coupled to the corresponding electrodes of the tubes so that the same are in a regenerative oscillation generating system. Moreover, in each modification two piezo electric crystals are used, there being a crystal connected with the control grid of each tube. In certain of the embodiments such as, for example, Figs. 1 and 2, 6 and 7, the crystals are between the said other end of the tank circuit and the control grids.

Figure 3:
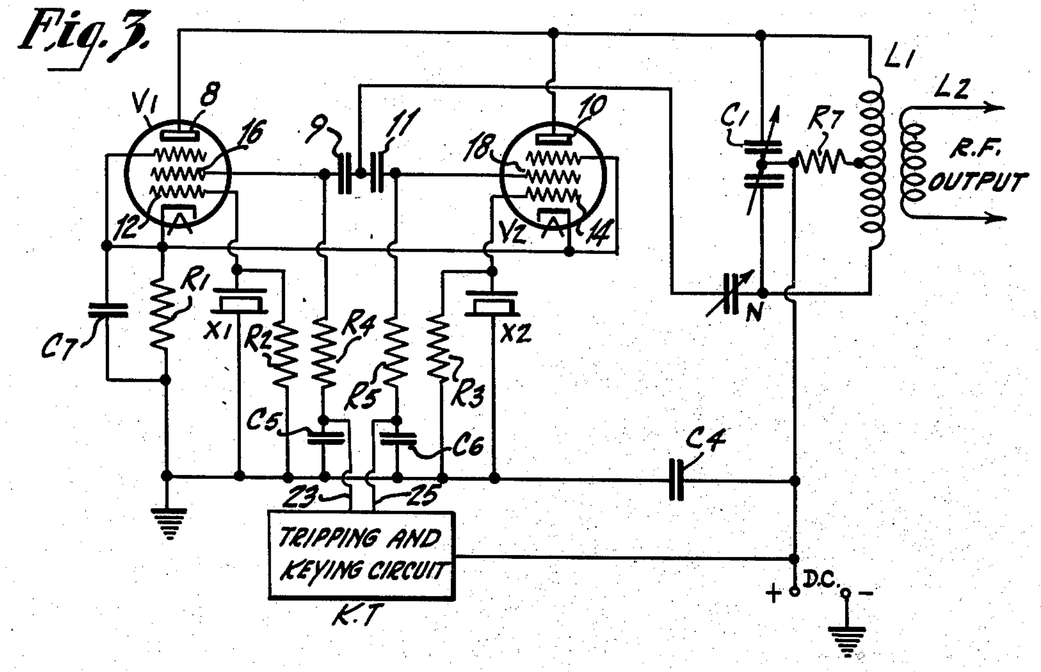
Figure 4:
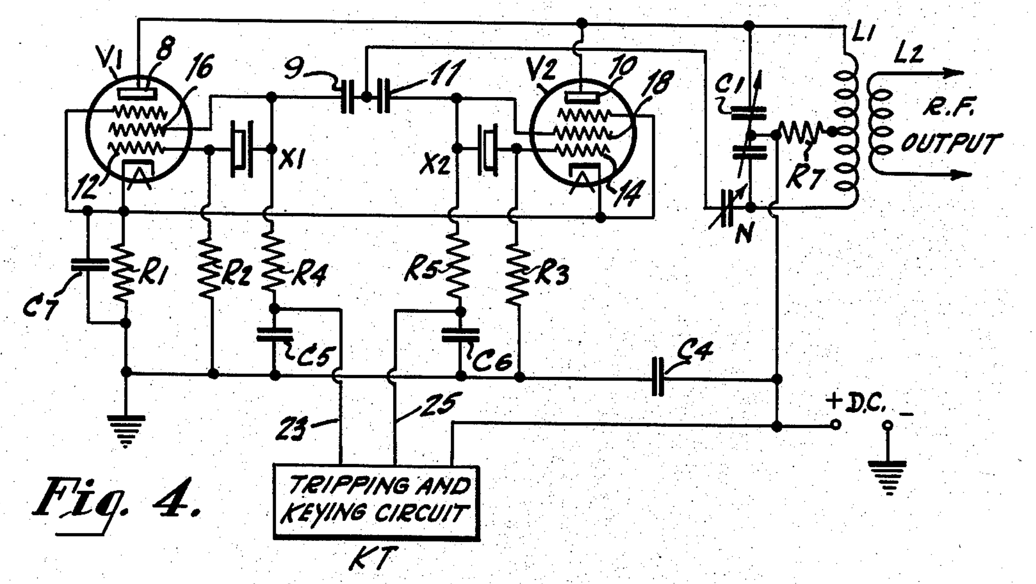
Figure 5:
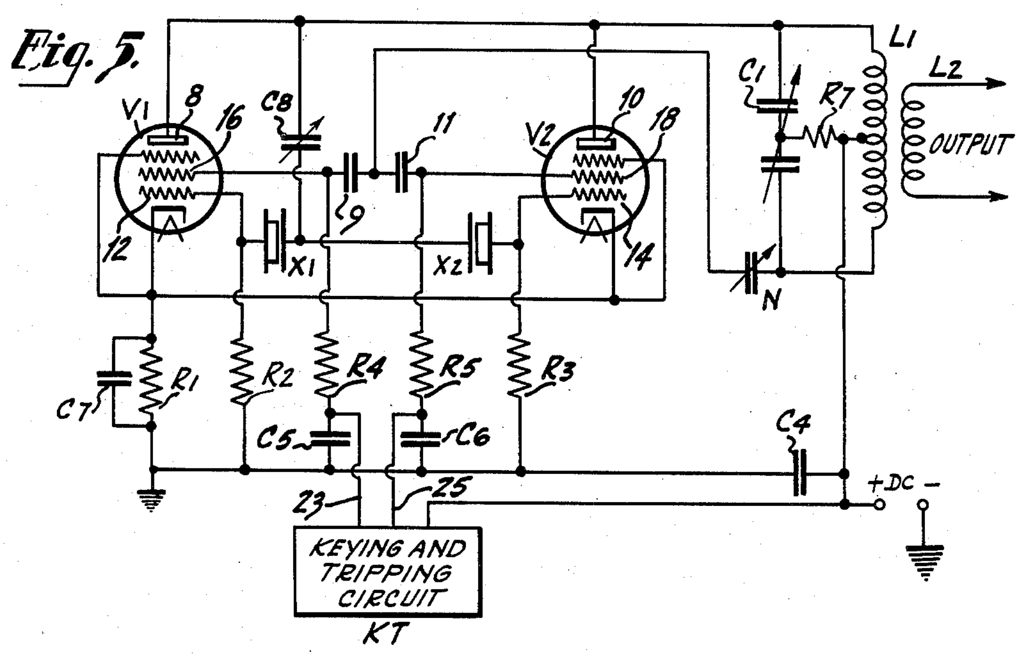

In the embodiments of Figs. 3, 4 and 5, the crystal is between the control grid and another tube electrode.

Figure 6:
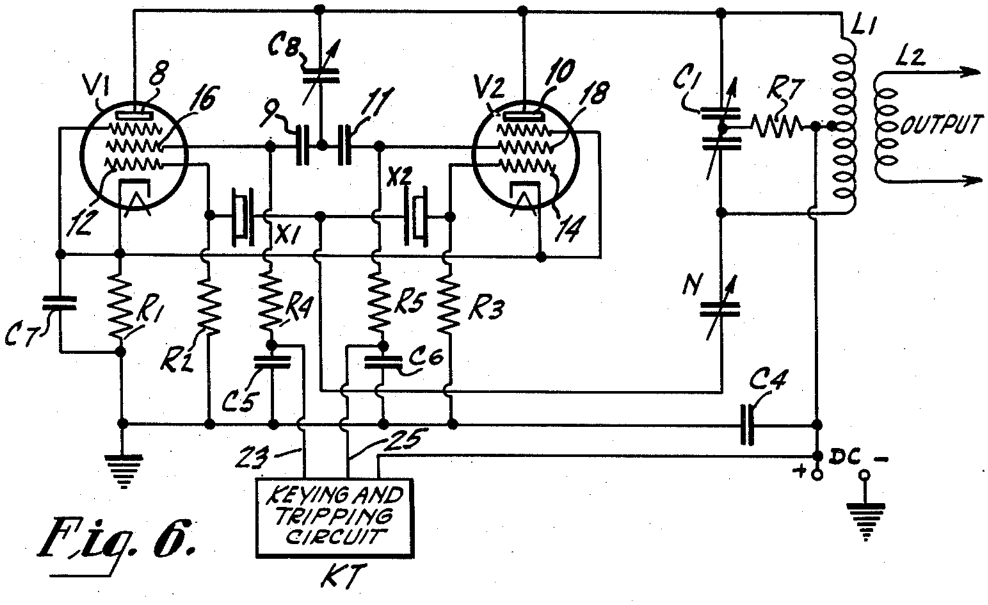

In Figs. 5 and 6 an additional feedback path is provided.

Figure 8:
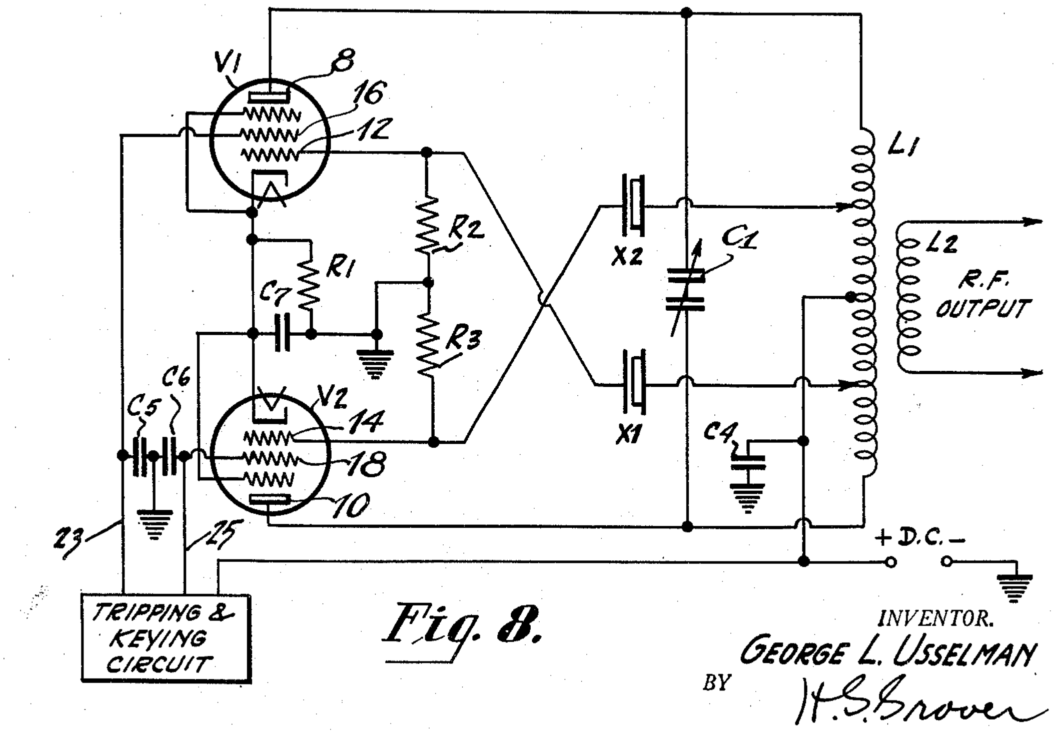

Fig. 8 illustrates a modification of my system wherein the input and output electrodes of the two tubes are coupled in pushpull relation to the tank circuit.

Referring to the drawings and in particular to Fig. 1, the electron discharge devices V1 and V2 have their anodes 8 and 10 tied together and coupled to one end of a parallel tuned tank circuit comprising an inductance L1 and a condenser C1 tuned to a frequency preferably intermediate the frequency *f1* at which crystal X1 operates, and the frequency *f2* at which crystal X2 operates. A point intermediate the terminals of L1 is coupled to ground and the cathode of the tubes V1 and V2 by a radio frequency bypass, coupling and direct current potential blocking condenser C4. Note C4 shunts the direct current source for the anodes 8 and 10 of the tubes. The crystal X1 is coupled between the control grid 12 of tube V1 and the other end of the parallel tuned circuit, while the crystal X2 is coupled between the control grid 14 of tube V2 and the said other end of the tuned circuit. A variable regeneration adjusting or neutralizing condenser N is included in the last two couplings. The cathodes of the tubes are tied together and connected to ground by a common cathode biasing resistor R1. This biasing resistor is shunted by a radio frequency bypass condenser C7. A grid leak resistance R2 connects the grid 12 to ground while a grid leak resistance R3 connects the grid 14 to ground. Modulation may be applied as desired to the electrodes in the tubes V1 and V2. In the embodiment illustrated in Fig. 1 the modulation is applied to the screening electrodes 16 and 18 differentially by leads 23 and 25 from a tripping circuit described hereinafter. The screen grid electrodes 16 and 18 are tied to ground by radio frequency bypassing condensers C5 and C6 which are small enough to block passage of alternating current of the keying or modulation frequency.

In operation the tank circuit including condenser C1 and L1 is tuned to the frequencies of the crystals X1 and X2. Note as stated above the crystals X1 and X2 operate at frequencies separated by a small amount such as several hundred cycles and strictly speaking this tank circuit is tuned to a frequency intermediate the crystal frequencies but the tank circuit is tuned broadly enough to operate at the frequency of either crystal. In this case the crystals act like filters. The control grids are excited by radio frequency potentials 180° out of phase with the anode potential, since the tank coil L1 is bypassed to ground near the middle. Very little anode to grid feedback can take place in the tubes, consequently only a small amount of capacity in condenser N is necessary to support oscillations.

When proper potentials are applied to the circuits and particularly to the tube electrodes the crystals and the circuits start oscillating due to feedback through variable condenser N and crystals X1 and X2 to the control grids 12 and 14 respectively. Oscillations continue as long as the crystals oscillate. If the potentials on the control electrodes or screening electrodes are about similar the crystal oscillator will be entrained by the close coupling at the parallel anodes and in the tank circuit and at the grids. The system oscillates at this intermediate frequency. The resistance R1 is common to the cathode return circuits of both tubes and when R2 and R3 are of about the same value the control grids have like biases. This is so also when differential modulation is applied because an increase of current through one tube is offset by a decrease of current through the other tube and vice versa.

If it is now assumed that the potential on the control electrode or screening electrode of tube V1 is changed then the frequency of operation of the circuit will be changed because one tube will have less gain than the other and will oscillate strongly and entrain or pull the other or weaker oscillator along with it so that now the system has shifted its frequency of operation to "mark" or "space" frequency depending on which tube and crystal is in control. In the embodiment illustrated I differentially key the screen grid potentials by means of a tripping and keying circuit as disclosed in my United States application Serial #535,829, filed May 16, 1944, which has now ripened into Patent No. 2,497,965, dated February 21, 1950.

The keying or modulating circuit comprises a pair of electron discharge tubes V3 and V4 coupled in a tripping circuit smilar in many respects to that shown in Finch U. S. Patent 1,844,950. In this circuit the anode of V3 is coupled by a resistance 34 to the control grid 28 of V4, while the anode of V4 is coupled by a resistance 36 to the control grid 26 of tube V3, the arrangement being such that when current starts to flow in say V3 the potential drop at the anode thereof is impressed back on the control grid 28 of tube V4 to bias the grid more negative so that more current flows through tube V3 and the current in the system is switched through and remains in V3 until something occurs which starts to increase the current flow through V4 so that its anode becomes less positive and this decreasing potential is supplied to the control grid 26 of V3 to make it more negative and reduce current in tube V3 until the current of the system is switched through tube V4. The anode of V3 is connected to the direct current source by a resistance 30 while the anode of V4 is connected to the direct current source by the resistance 32. A potentiometer resistance 52 is connected between the anode of V3 and a point on the potentiometer resistance 60. A potentiometer resistance 54 is connected between the anode of V4 and a point on the resistance 60. Resistance 60 is in shunt to a source B1 of direct current potential, the positive end of which is grounded. The tap on potentiometer resistance 52 is connected by lead 23 to the screen grid 16 while the tap on potentiometer resistance 54 is connected by lead 25 to the screen grid 18 of tube V2. The connections are means for applying alternatingly positive and negative biases to the screen grids 16 and 18 of the tubes V1 and V2.

The control grid 26 of tube V3 is connected to its cathode by a resistance 38, a potentiometer resistance 46, and a common cathode resistance R6. The resistance R6 is shunted by a condenser 64 of sufficient value to bypass potentials of the keying frequency. The grid 28 of V4 is similarly connected to its cathode by a resistance 40, a potentiometer resistance 48, and the common cathode resistance R6. A source of potential B2 has its positive terminal connected to the cathodes and ground, and its negative terminal connected to a contact cooperating with the switch S1 to connect this source in shunt to a portion of resistance 46. The switch S1 has a second contact which when closed shorts a portion of the resistance 46.

The modulating or keying potentials represented by pulses of alternating current or direct current are applied to the leads 49 and 51. The arrangement is such that in the absence of signals the bias on the control grid 26 of V3 is negative and switches the current through the tube V4. This bias is obtained in part by the cathode resistor R6. The grids 26 and 28 are at different potentials due to the potentiometer action of resistors 36, 38 and 46, and resistors 34, 40 and 48. The required negative bias may be produced by the potential drop in resistances 46 and 38 due to current in resistor 36 and the cathode current in R6. If this bias is insufficient it may be supplemented by negative potential from source B2 with switch S1 on the left hand contact. However, usually sufficient bias is obtained during operation without the source B2. The grid of V3 may be made less negative by moving S1 to the right hand contact to short a portion of resistance 46. Grid 26 is biased more negative or less positive than is the grid 28 in the absence of any signal. A negative signal pulse throws grid 28 more negative which causes grid 26 to go more positive due to the drop in anode voltage of tube V4 which is coupled to grid 26 through resistor 36. The current is then tripped through tube V3. If during keying the bias produced in resistances 38 and 46 and R5 and on the grid 26 is so highly negative that the negative marking potentials are unable to switch the current from tube V4 to tube V3, the switch S1 is closed in the right hand position to short out a portion of resistance 46.

With the current flowing through tube V4 the anode thereof is less positive and the anode of tube V3 is more positive, so that the potential on the screen grid 16 of tube V1 is higher than the potential on the screen grid 18 of tube V2 and the tube V1 in the oscillation generator circuit oscillates strongly while the tube V2 oscillates weakly and is pulled along so that the system operates at the frequency at which V1 operates, i. e., at the frequency of crystal X1. This might be considered the spacing condition and also the carrier condition at which no marking signals are present. Now if a negative potential representing "mark" is applied at 49 the current through tube V4 is cutoff and the current through tube V3 is maximum. Now the anode potential of tube V4 rises and the anode potential of tube V3 falls so that the potential on the screen grid 16 is less positive and the potential on the screen grid 18 is more positive and the oscillator including tube V2 oscillates strongly to pull the weak oscillator including tube V1 in step therewith at the frequency at which crystal X2 operates. This may be considered the marking frequency.

When the negative marking potential discussed in the immediately preceding paragraph is removed or is insufficient, the circuit trips current back through the tube V4 which, as stated above, is the spacing condition. If the potentials at 49 are alternating current pulses the tripping operation is the same because the negative alternations thereof make the grid 28 more negative and trip the current from tube V4 to tube V3. The positive variations of the alternating current are ineffective because the current is already maximum in tube V4 at this point in the operation. The alternating current keying potentials cause the tripping circuit to function without the aid of the source B2. However, when the signal is removed the source B2 may be included to hold the transmitter on space or carrier condition if necessary. This tripping action not only squares the wave but also limits the same.

The potentials of the anodes of tubes V3 and V4 depend on their state of conductivity and on the positive potential applied to the adjacent terminals of resistances 30 and 32, and on the negative potential applied to the adjacent terminals of resistances 52 and 54. The potentials on grids 16 and 18 of tubes V1 and V2 depend on the position of the taps on resistances 52 and 54, and on the state of conductivity of the tubes V3 and V4. By adjusting potentiometers 52, 54 and 60, etc., the desired screen grid potentials varying differentially from a negative to a positive value or varying between positive values above and below an average positive value, are derived at the leads 23 and 25 and fed to the screen grids 16 and 18.

When three element tubes are used the arrangement may be as illustrated in Fig. 2. To expedite description of the arrangement of Fig. 2 numerals corresponding to those in Fig. 1 have been used in so far as possible. Moreover, details of the tripping circuit have been omitted in Fig. 2. In the arrangement of Fig. 2 the crystals X1 and X2 are again connected by the condenser N between one end of circuit C1L1 and the control grids. The condenser N may be set to neutralize the system or to introduce regeneration. In the first adjustment this condenser is set so that its capacity with the series capacity of the crystal electrodes just equals the grid to anode capacity of the two tubes when the crystals are not oscillating. In the second adjustment voltage is fed back in regenerative sense and of the desired magnitude to produce sustained oscillations whether the crystal is oscillating or not. In this circuit the feedback condenser N is a real neutralizing condenser. The series capacity of the condenser N and the crystal holders is adjusted to neutralize, or balance the anode to grid capacity of the tubes. Oscillations can then take place in the circuit only when the crystals oscillate. One active crystal will support oscillations but both crystals should be active for good results.

The control potentials in this embodiment are fed by leads 23 and 25 to the control grids through resistances R2 and R3. Condensers C'5 and C'6 are large enough to bypass radio frequency voltages and small enough to block voltages of the modulation frequencies. The tripping circuit output and control adjustment is such that the bias potentials vary differentially about a negative value. This is accomplished primarily by adjusting potentiometers 52, 54 and 60 of the keying and tripping circuit.

A point on the inductance L1 is coupled to a point on the rotor of the two sections of the condenser C1 by the resistance R7 to uncouple the capacitive and inductive branches of the tank circuit so that split tuning will not take place. In other words, resistor R7 prevents the upper and lower halves of the tank circuit from being resonant at different frequencies in case their constants are not similar. The use of R7 is desirable in order that all parts of the tuning condenser C1 be kept at the same direct current potential to thereby prevent arcing or condenser breakdown.

In these systems the crystals act as very narrow band pass filters. Assuming that proper potentials are applied to the circuits, the tank condenser is adjusted so that the circuit is approximately in tune with the crystal frequencies. The circuit will oscillate through the capacity of the crystal electrodes even though the crystals do not oscillate, if the condenser N has enough capacity. When the tank condenser is set correctly the tank circuit and the two crystals all oscillate at the same frequency. That is, assuming that the two crystals made for mark and space frequencies are not too widely separated, which is a few hundred but not more than one or two thousand cycles apart. Due to the action of the tripping circuit only one oscillator tube and consequently only one crystal controls the frequency of the tank circuit oscillations at one time. So that, as the tripping circuit keys the two oscillator tubes V1 and V2 off and on alternately, first one crystal and then the other controls the tank circuit oscillation frequency and the "mark" and "space" frequencies are sent out in accordance with the signal impulses.

Differential modulation applied by the keying and tripping circuit KT as described hereinbefore varies the frequency of the generated oscillations in accordance with the keying potentials from the frequency of crystal X1 to the frequency of crystal X2 and vice versa. This embodiment is extremely simple in nature and operation, and provided satisfactory results in a frequency shift telegraphy test circuit.

In the modification illustrated in Fig. 3 the screening electrodes 16 and 18 are coupled by the variable capacitor N to the end of the tank circuit C1L1 remote from that end to which the anodes are coupled. The condensers 9 and 11 couple the screen grids 16 and 18 in parallel with respect to the radio frequency voltages. The junction point of these condensers 9 and 11 is connected by capacitor N to one end of the parallel circuit C1L1. The crystals X1 and X2 are connected between the control grids 12 and 14 and ground. The screen electrodes 16 and 18 are connected to the leads 23 and 25 by potential dropping resistances R4 and R5. The crystals X1 and X2 are shunted by the biasing resistances R2 and R3. The anode alternating current and direct current circuit is about as in Fig. 2.

In Fig. 3 the feedback capacity is between the screen grids and the control grids. The tank circuit C1L1 is coupled to the screen grids through condenser N. It may be noted that the anodes and the screen grids together with the tank circuit C1L1 constitute an oscillator circuit. The condenser N is set for very weak oscillations in this circuit. Then the tank circuit C1L1 is tuned to the crystal frequency so that the crystals also oscillate. In this case the crystals oscillate in the same potential phase as the anodes but in opposite phase to the screen grid potential. It probably is not necessary to state that these oscillators operate by the Miller principle although it might help in understanding the operation.

In the circuit of Fig. 3 there are three oscillating circuits. The output circuit oscillator is as follows: Anodes-tank circuit C1L1, condenser N and the screen grids. The frequency control oscillators are the screen grids-control grids and the crystals. Of course the cathodes are common to both oscillator circuits. Since the crystals are connected to the control grids they control the frequency of the oscillator circuits if C1L1 is set near the crystal frequencies.

More specifically in Fig. 3 there are three oscillating circuits, that is, the two crystals and the tank circuit. Assuming that proper potentials are applied to these circuits the tank circuit C1L1 will oscillate by feedback through condenser N to the screen grids 16 and 18 of tubes V1 and V2. The tank circuit C1L1 is next tuned to the frequencies of the two crystals and both crystals together with the tank circuit oscillate at the same frequency, assuming that the mark and space frequencies of the two crystals are not too far apart. However, due to the action of the tripping circuit only one tube functions at one time and consequently only one crystal controls the frequency at one time as the circuit is keyed from mark to space and vice versa in accordance with the signal impulses. The crystals oscillate due to capacity feedback within the tubes between the screen grids and the control grids. The crystals of Fig. 3 may be assumed to oscillate in the Miller mode. If the mark and space frequencies are made more than a few hundred or one or two thousand cycles apart the crystals will not follow each other and they will stop oscillating each time the tube is cut off. This will cause slow distorted keying since the crystal must start each time the tube is turned on. Also if the mark and space frequencies are several thousand cycles apart they will not properly control the frequency of the tank circuit oscillations.

Fig. 4 illustrates a modification of the prior arrangements. In this embodiment the crystal X1 is coupled between controlled grid 12 and screen grid 16, while the crystal X2 is placed between the control grid 14 and screen grid 18. The other connections are about as in Fig. 3. The crystals in this circuit oscillate in the Pierce mode. Likewise in Fig. 4 the anodes—tank circuit C1L1—condenser N and the screen grids constitute one oscillator circuit. Condenser N is set for very weak oscillations in this anode circuit. The crystal oscillating circuits are composed of the screen grids and the control grids and the crystals. The crystals are driven to oscillate by the screen grids. The latter behave like an inductance, which tunes the capacity between the screen and control grids, putting opposite potentials between the screen grids and the control grids. Since the crystals are connected to the control grids they control the frequency of the total circuit when they oscillate. It could be stated that circuits of this type (Figs. 3, 4 and 5) are composed of three oscillating circuits—the anode oscillator always being controlled by one of the crystal oscillators. In these circuits both crystals oscillate at the same frequency, which is that of the crystal oscillator delivering the greater power. In other words, the two crystals are normally synchronized with each other at some frequency at or intermediate their natural frequencies depending on the signal keying conditions.

In Figs. 3 and 4 the purpose of R7 is to permit use of the radio bypass condenser C4 on the central point of both branches of the tuned circuit, and at the same time to prevent split tuning as described above. This increases the rating of condenser C1 because all parts of the condenser have the same D. C. potential on it, so that the condenser plates have to stand only the A. C. potentials.

In the embodiment of Fig. 5 the feedback path through variable capacitor N is as in Figs. 3 and 4 to the screen grids. The crystals X1 and X2 in Fig. 5 are between the control grids so that the control grids are coupled in parallel thereby for radio frequency voltages. The junction point of the crystals is coupled by a variable capacitor C8 to the anodes 8 and 10.

In Fig. 5 the crystals act as filters. The screen grids are coupled to one end of the tank circuit C1L1 by condenser N. The crystals X1 and X2 are coupled to the other end of the same tank circuit through condenser C8. The center part of coil L1 is grounded for radio frequency. The phases of the voltages on the screen grids and the control grids are in opposition because they come from opposite ends of the tank circuit and this supports the oscillations. The anodes are connected to the same end of the tank circuit as are the crystals and consequently have the same phase. Again we have the three oscillator circuits which are: The output circuit; comprising anodes—tank circuit C1L1—condenser N (bypass condensers 9 and 11) and the screen grids. Then the two crystal oscillator circuits; comprising control grids—crystals X1 and X2—condenser C8—tank circuit C1L1—condenser N (bypass condensers 9 and 11 and the screen grids. Since the crystals are connected to the control grids they control the output frequencies depending on which crystal and tube is delivering the greater power).

The oscillations in Fig. 5 are of the filter type since the crystals are connected between the control grids and the end of the tank circuit opposite the screen grids of tubes V1 and V2. Condenser C8 is adjusted with just enough capacity to make the circuit oscillate, then the feedback condenser N is set for best operation. The crystals have only one feedback path and that is condenser C8. Condenser N couples the screen grids to the opposite end of tank circuit C1L1 for the crystal oscillator circuit. Of course condenser N is also a regeneration condenser in the anode-screen grid oscillator circuit.

The tank circuit C1L1 of these generators is so arranged and operated as to have a large circulating current. This produces a large "flywheel" effect so that the change in frequency is not so sudden. This is beneficial in preventing keying surges.

The circuit of Fig. 6 is a modification of the embodiment of Figs. 3, 4 and 5, the crystals and screen grid connections being reversed in relation to condensers C8 and N and also it has features found in Figs. 1 and 2. In this embodiment the tank circuit is again coupled at one end to the anodes. The screening electrodes are tied together by condensers 9 and 11. The crystals X1 and X2 are between the control grids 12 and 14, and the adjacent plates of the crystal holders are coupled by the variable capacitor N (the reverse of Fig. 5) to the lower end of circuit C1L1. The screen grids 16 and 18 are coupled in parallel (with respect to radio frequency currents) by condensers 9 and 11. The adjacent terminals of these condensers are tied together and coupled by capacitor C8 to the anodes 8 and 10, and the end of tank circuit C1L1 opposite the crystals.

Oscillations in Fig. 6 occur with the crystals acting as filters. It can be seen that the crystal and screen grid connections are reversed as compared with Fig. 5 in regard to condensers C8 and N. Condensers N and C8 are set for best operation. Usually only just enough capacity is used to promote oscillations. Condenser C8 is connected to the screen grids and the crystals X1 and X2 are connected to condenser N. However, in this embodiment the screen grids and the anode radio frequency potentials are in phase, whereas the control grids are 180° out of phase with both. The circuit is similar to Figs. 1 and 2 and the operation is also similar.

Figure 7:
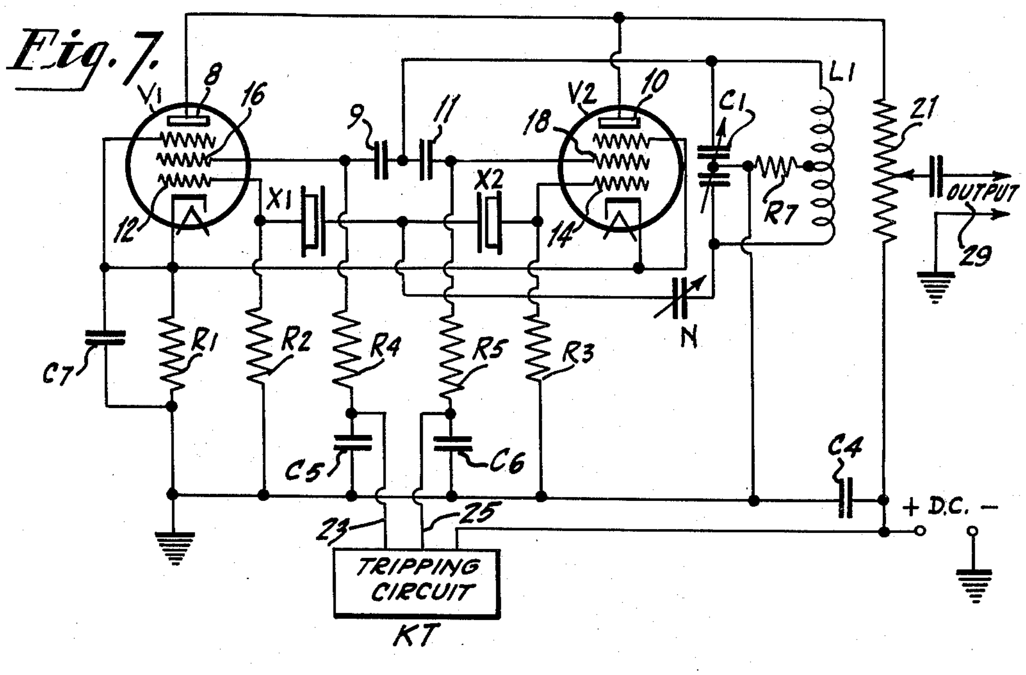

Fig. 7 is similar to Fig. 6 except that the upper end of the tank circuit is connected to the screen grids (now acting as anodes) through bypass condensers 9 and 11, while the anodes 8 and 10 are in a separate output circuit including load resistance 21. The principle of operation is the same as for Figs. 1, 2 and 6, taking into account the separate anode output circuit. In other words, the crystals in this circuit act as filters. Condenser C8 is not used. In Fig. 7 the condenser N may be used for neutralizing, that is, it may be adjusted so that its capacity in series with the capacity of the crystal holders just neutralizes the control grid to screen grid capacity. The separate electron coupled output circuit load 21 prevents the next stage from reacting to any great extent on the oscillator. The screen grids in this embodiment serve as the oscillation generator anodes. The main anodes are electronically coupled to the oscillation generating circuits by the electron streams within the tubes V1 and V2. The output is taken from the main anodes 8 and 10 and appears across resistance 21 connecting the anodes in parallel. Output leads 29 tapped to a point on resistance 21 and to ground supply the frequency shifted output for use or further amplification or multiplication.

Fig. 8 is a pushpull modification like the arrangement of Fig. 1 in some respects. In Fig. 8 it may be noted that the anodes of tubes V1 and V2 are connected to opposite ends of the tank circuit C1L1. A point intermediate the ends of the tank circuit is grounded as are the cathodes for radio frequency voltages. The control grids are also connected to points on the tank inductance coil L1 toward opposite ends. The grids are crossed so that the radio frequency voltages therein are in phase opposition with respect to the radio frequency voltages on the anodes. The screen grids are bypassed to ground by condensers C5 and C6 and also connected to the tripping circuit in the same manner as Fig. 1. In this case the condenser N is omitted and the crystals are connected directly to the tank circuit. The crystals are filters in this circuit. During operation the anodes 8 and 10 are of opposed polarity in the oscillation generator circuits. The grids are also of opposed polarity in the oscillation generating circuits. The couplings to the grids are crossed so that the grid and anode of each tube also operate in opposed voltage relation in the generating circuits. Each tube with the tank and its crystal may be considered a generator operating at its crystal frequency. The tubes, however, are entrained by the tank circuit to operate at a single frequency when the tube electrodes are supplied with balanced direct current potentials. The operating frequency is the frequency to which the tank circuit C1L1 is tuned and is also a frequency about midway between the frequencies F1 and F2 of crystals X1 and X2.

When the tripping and keying arrangement KT operates the amplification factors of the tubes V1 and V2 are differentially modulated as described hereinbefore and one tube or the other develops strong oscillations to entrain both tubes to oscillate at its frequency. Thus the frequency of the oscillations generated is shifted by the signal pulses from F1 to F2 and vice versa.

It should be noted that the regeneration condenser N should generally be operated with as small a capacity setting as possible to insure good frequency control by the crystals. Too much regeneration may cause keying clicks and in the case of weak or poor crystals control of the frequency may be lost.

Increasing the size of the screen grid bypass condensers C5 and C6 may be used to reduce or eliminate any undesirable keying clicks. The action is to round off the corners of the signal. This can not be carried too far if high speed keying is to be accomplished.

What is claimed is:

1. In a signalling system, two electron discharge tubes each having electrodes including an oscillator anode, a cathode, and a control grid, two piezoelectric crystals one tuned above, the other tuned below a desired mean operating frequency, a circuit parallel tuned to said desired mean frequency which is substantially intermediate the frequencies to which said crystals are tuned, a connection tying the oscillator anodes of said tubes together and to one end of said parallel tuned circuit, connections of low impedance to voltages of the said desired frequency coupling a point intermediate the ends of said parallel tuned circuit to the cathodes of said tubes, couplings between the other end of said parallel tuned circuit and corresponding control grids of said tubes, means including one crystal in a coupling between the control grid and another electrode of one tube and the other crystal in a coupling between the control grid and another electrode of the other tube, the arrangement being such as to establish regeneration in said tubes and circuits for the production of oscillations which are entrained by said parallel tuned circuit to be of said desired operating frequency, and connections to said tubes for differentially modulating the same in accordance with signals to correspondingly vary the frequency of the oscillations generated.

2. In a signalling system, two electron discharge tubes each having an anode, a cathode, a control grid and an auxiliary electrode, two piezoelectric crystals, one tuned above, the other tuned below a desired operating frequency, a circuit parallel tuned to said desired frequency which is substantially intermediate the frequencies to which said crystals are tuned, a connection tying the anodes of said tubes together and to one end of said parallel tuned circuit, connections of low impedance to voltages of the said desired frequency coupling a point intermediate the ends of said parallel tuned circuit to the cathodes of said tubes, couplings between the other end of said parallel tuned circuit and the control grids of said tubes, means including one crystal in the coupling to one control grid and the other crystal in the coupling to the other control grid, the arrangement being such as to establish regeneration in said tubes and circuits for the production of oscillations of said desired operating frequency, and connections to said auxiliary electrodes for differentially modulating the same in accordance with signals.

3. In a signalling system, two electron discharge tubes each having an anode, a cathode, and a control grid, two piezoelectric crystals, one tuned above, the other tuned below a desired operating frequency, a circuit parallel tuned to said desired frequency which is substantially intermediate the frequencies to which said crystals are tuned, a connection tying the anodes of said tubes together and to one end of said parallel tuned circuit, connections of low impedance to voltages of the said desired frequency between a point intermediate the ends of said parallel tuned circuit and the cathodes of said tubes, couplings between the other end of said parallel tuned circuit and the control grids of said tubes, means including one crystal in the coupling to the control grid of one tube, means including the other crystal in the coupling to the control grid of the other tube, the arrangement being such as to establish regeneration in said tubes and circuits for the production of oscillations of said desired operating frequency, and connections to said control grids for differentially modulating the same in accordance with signals.

4. In a signalling system, two electron discharge tubes each having an anode, a cathode, a control grid and an auxiliary electrode, two piezoelectric crystals, one tuned above, the other tuned below a desired operating frequency, a circuit parallel tuned to said desired frequency which is substantially intermediate the frequencies to which said crystals are tuned, a connection tying the anodes of said tubes together and to one end of said parallel tuned circuit, connections of low impedance to voltages of the said desired frequency between a point intermediate the ends of said parallel tuned circuit and the cathodes of said tubes, a connection between the other end of said parallel tuned circuit and said auxiliary electrodes of said tubes, means including one crystal in a coupling between the control grid and cathode of one tube, means including the other crystal in a coupling between the control grid and cathode of the other tube, the arrangement being such as to establish regeneration in said tubes and circuits for the production of oscillations of said desired operating frequency, and connections to said auxiliary electrodes for differentially modulating the same in accordance with signals.

5. In a signalling system, two electron discharge tubes each having an anode, a cathode, a control grid and an auxiliary electrode, two piezoelectric crystals, one tuned above, the other tuned below a desired operating frequency, a circuit parallel tuned to said desired frequency which is substantially intermediate the frequencies to which said crystals are tuned, a connection tying the auxiliary electrodes of said tubes together and to one end of said parallel tuned circuit, connections of low impedance to voltages of the said desired frequency coupling a point intermediate the ends of said parallel tuned circuit to the cathodes of said tubes, couplings between the other end of said parallel tuned circuit and the control grids of said tubes, means including one crystal in the coupling to one control grid and the other crystal in the coupling to the other control grid, the arrangement being such as to establish regeneration in said tubes and circuits for the production of oscillations of said desired operating frequency, an output circuit coupled to the anodes of said tubes, and connections to said auxiliary electrodes for differentially modulating the same in accordance with signals.

6. In a signaling system, a pair of electron discharge devices each having electrodes including at least a control grid, a cathode and an electrode serving as an oscillation generator anode, two crystals dimensioned to normally operate at different frequencies, a tuned circuit comprising parallel inductance and capacitance, means including said crystals and said tuned circuit directly coupling the said electrodes of each of said devices in a separate regenerative oscillation generator circuit, said regenerative circuits including one of said crystals coupled substantially between one end of said tuned circuit and the control grid of one device and the other of said crystals coupled substantially directly between said one end of said tuned circuit and the control grid of the other device whereby a different one of said crystals is in the feedback circuit of each of said generators and whereby said tuned circuit is common to and directly coupled to both generators and entrains the same for operation as one generator at a common mean frequency, means for differentially modulating the two devices in accordance with signals so that the said two generators predominate alternatively, and an output circuit coupled to said generators.

7. A signalling system in accordance with claim 6, wherein the electrodes of each of said devices include also an auxiliary electrode and wherein the last-named means acts to differentially modulate the potentials on the auxiliary electrodes of the two devices in accordance with signals.

GEORGE L. USSELMAN.

REFERENCES CITED

The following references are of record in the file of this patent:

UNITED STATES PATENTS

| Number | Name | Date |
|---|---|---|
| 2,304,388 | Usselman | Dec. 8, 1942 |
| 2,309,083 | Usselman | Jan. 26, 1943 |
| 2,375,527 | Crosby | May 8, 1945 |